United States Patent
Vigneras et al.

(10) Patent No.: US 11,165,659 B2
(45) Date of Patent: Nov. 2, 2021

(54) CLIENT/SERVER ARCHITECTURE FOR ADMINISTERING A SUPERCOMPUTER

(71) Applicant: Bull SAS, Les Clayes sous Bois (FR)

(72) Inventors: Pierre Vigneras, Angervilliers (FR); Sebastien Miquee, Arpajon (FR)

(73) Assignee: BULL SAS, Les Clayes sous Bois (FR)

( * ) Notice: Subject to any disclaimer, the term of this patent is extended or adjusted under 35 U.S.C. 154(b) by 636 days.

(21) Appl. No.: 15/264,015

(22) Filed: Sep. 13, 2016

(65) Prior Publication Data

US 2017/0085435 A1 Mar. 23, 2017

(30) Foreign Application Priority Data

Sep. 17, 2015 (FR) ...................................... 1558775

(51) Int. Cl.
*H04L 12/24* (2006.01)
*G06F 9/50* (2006.01)
*H04L 29/06* (2006.01)

(52) U.S. Cl.
CPC ............ *H04L 41/20* (2013.01); *G06F 9/5077* (2013.01); *H04L 67/42* (2013.01)

(58) Field of Classification Search
CPC ............. G06F 11/3664; G06F 11/3688; G06F 9/5077; H04L 41/20
See application file for complete search history.

(56) References Cited

U.S. PATENT DOCUMENTS

| | | | | |
|---|---|---|---|---|
| 2009/0006808 | A1* | 1/2009 | Blumrich | G06F 15/17337 712/12 |
| 2010/0185719 | A1* | 7/2010 | Howard | G06F 9/5044 709/201 |
| 2012/0265959 | A1* | 10/2012 | Le | G06F 9/45558 711/162 |
| 2013/0152047 | A1* | 6/2013 | Moorthi | G06F 11/368 717/124 |
| 2015/0229645 | A1* | 8/2015 | Keith | H04L 41/50 726/4 |
| 2016/0321108 | A1* | 11/2016 | Xue | G06F 9/5027 |

OTHER PUBLICATIONS

Preliminary Search Report and Written Opinion dated Jun. 28, 2016 out of French priority Application No. I558775 (11 pages).

(Continued)

*Primary Examiner* — Austin J Moreau
(74) *Attorney, Agent, or Firm* — Meagher Emanuel Laks Goldberg & Liao, LLP

(57) ABSTRACT

The invention relates in particular to an administration server (S) of a supercomputer suitable for first loading information on the environment of said supercomputer; receiving an administration task transmitted by an administration client (C1, C2); executing said administration task in collaboration with said information, previously loaded; and transmitting the results of the execution of said administration task to said administration client.

10 Claims, 1 Drawing Sheet

(56) References Cited

OTHER PUBLICATIONS

Anonymous author: "CLI Tutorial—Graphite" [Internet tutorial], [last edited Mar. 16, 2011], <http://graphite.wikidot.com/cli-tutorial>, XP055283862, [extracted from the Internet Jun. 27, 2016] (5 pages) Copied with permission from <URL:http://tech.mangot.com/roller/dave/entry/the_graphite_cli>, The Graphite CLI by Dave Mango (cited as Reference DI in the Preliminary Search Report and Written Opinion dated Jun. 28, 2016 out of French Priority Application No. I558775).
Currier, Writing Custom Nagios Plugins with Python, Linux Magazine [online article], [written Feb. 16, 2010], <URL:https://web.archive.org/web/20140602035042/http://www.linux-mag.com/id/7706> XP055283983, [extracted from the Internet Jun. 27, 2016] (3 pages), (cited as Reference D2 in the Preliminary Search Report and Written Opinion dated Jun. 28, 2016 out of French Priority Application No. I558775).
Nolan, "Lustre Monitoring and Statistics Guide" [Lustre Wiki online guide] [last revision Aug. 10, 2015] <URL:http://wiki.lustre.org//index.php?title=Lustre_Monitoring_and_Statistics_Guide&oldid=847>, XP055283938, [extracted from the Internet Jun. 27, 2016] (9 pages) (cited as Reference D3 in the Preliminary Search Report and Written Opinion dated Jun. 28, 2016 out of French Priority Application No. I558775).
Anonymous author, "Faq—Graphite", [Wiki online article] [last edited: Mar. 3, 2009] <URL:http://graphite.wikidot.com/faq>, XP055283857, [extracted from the Internet Jun. 27, 2016] (4 pages) (cited as Reference D4 in the Preliminary Search Report and Written Opinion dated Jun. 28, 2016 out of French Priority Application No. I558775).
Anonymous author, "Carbon-Graphite", [Wiki online article] [last edited: May 7, 2008] <URL:http://graphite.wikidot.com/carbon>, XP055283859, [extracted from the Internet Jun. 27, 2016] (2 pages) (cited as Reference D5 in the Preliminary Search Report and Written Opinion dated Jun. 28, 2016 out of French Priority Application No. I558775).
Anonymous author, "High Level Diagram—Graphite", [Wiki online article] [last edited: Jul. 5, 2008], XP055283864, <URL:http://graphite.wikidot.com/high-level-diagram>, [extracted from the Internet Jun. 27, 2016] (3 pages) (cited as Reference D6 in the Preliminary Search Report and Written Opinion dated Jun. 28, 2016 out of French Priority Application No. I558775).
Anonymous author, "Copy-on-write", from Wikipedia, the free encyclopedia [Wiki online article], [last edited Sep. 3, 2015], XP055283851 , <URL:https://en.wikipedia.org/w/index.php?title=Copy-on-write&oldid=679317977>, [extracted from the internet 2016-06-27] (3 pages) (cited as Reference D7 in the Preliminary Search Report and Written Opinion dated Jun. 28, 2016 out of French Priority Application No. I558775).
Goldberg, Python—Getting Data Into Graphite—Code Examples, [Internet technology blog] [posted Apr. 9, 2012], XP055283867, <URL:http://coreygoldberg.blogspot.com/2012/04/python-getting-data-into-graphite-code.html> [extracted from the Internet Jun. 27, 2016] (3 pages) (cited as Reference D8 in the Preliminary Search Report and Written Opinion dated Jun. 28, 2016 out of French Priority Application No. I558775).

\* cited by examiner

CLIENT/SERVER ARCHITECTURE FOR ADMINISTERING A SUPERCOMPUTER

This application claims priority to French patent application No. 1558775 filed on Sep. 17, 2015, the entire contents of which are incorporated herein by reference.

BACKGROUND

The invention relates to the field of supercomputers. More precisely, it relates to the administration of such supercomputers.

A supercomputer is a system for processing information intended to achieve the highest possible performances for processing the information. Supercomputers are expensive systems that find applications in specific fields: meteorological forecasting, molecular modeling, physical or mechanical simulations, computations in the nuclear field, etc. Applications are also found in the field of finance, in the military field, etc.

Such supercomputers, in general, consist of an interconnection of a very large number of items of equipment. This equipment comprises processing nodes (or microprocessors), routing nodes (or routers), management nodes, etc.

In the past few years, supercomputers have attained powers of some petaFLOPS (or PFLOPS), the FLOP (standing for floating point operations per second) being the unit of measurement commonly accepted for assessing the power of a supercomputer. In order to achieve such power levels, these supercomputers may comprise several hundreds of thousands of interconnected items of equipment.

The next generations of supercomputer are predicted to achieve an exaFLOP, that is to say around 1018 FLOPs. Such supercomputers will have to comprise several tens of millions of items of equipment.

Administration, management or monitoring systems have been developed in order to enable an operator to control, manage, administer, configure or detect malfunctionings in supercomputers.

Such administration tasks are extremely varied, and the problems posed for the administrator are not all necessarily known in advance. Consequently administration tools are often open systems enabling a "human" administrator to determine the administration task to be performed by writing a computer program in the form of a script, that is to say in a high-level interpreted computer language.

Such tasks may correspond to varied administration problems: which equipment of the supercomputer is faulty? Which are the overloaded links? Which are all the items of equipment connected to such given equipment? Which are all the routes connecting two given items of equipment? etc.

The administrator can then in each case write the corresponding script and execute it via an administration tool functioning on an information processing system associated with the supercomputer in order to obtain the result.

To do this, the administration tool may access information on the environment of the supercomputer. This information comprises in particular information on the topology of the supercomputer, that is to say the way in which the various nodes of the supercomputer are interconnected, whether it be a case of computing nodes, routing nodes, management nodes, etc. It may also comprise information on routing tables, on the status of the equipment, etc.

However, this way of proceeding raises problems with the appearance of large-capacity supercomputers. As we have seen, these supercomputers may attain several tens of millions of items of equipment. Consequently the information on the environment of such supercomputers may form a considerable volume. Volumes of several tens of gigabytes may be evoked.

However, in order to deal with each administration task, the administration tool must load all this information into memory. Because of the considerable volume of this for the new supercomputers, such loading into memory may take several seconds, or even a few minutes. Such a delay applied to each administration task is obviously not acceptable for an administrator.

It should be noted that, in some cases, the administrator may be led to execute several administration tasks in a row, or to test one administration task several times before obtaining the result sought. The delay of several seconds or even minutes applied to each execution makes this practice entirely unusable.

The aim of the invention is therefore to propose a method and a system at least partially overcoming the aforementioned drawbacks. In particular, the invention makes it possible to considerably reduce the latency time between the triggering of the execution of an administration task and the obtaining of results.

SUMMARY

The aim of the present invention is to provide a solution at least partially overcoming the aforementioned drawbacks.

To this end, the present invention proposes a method for administering a supercomputer, comprising the steps consisting of:

determining an administration task on an administration client, transmitting said administration task to an administration server associated with information on the environment of said supercomputer, said information previously being loaded into the memory of said server;

executing said administration task in collaboration with said information;

transmitting the results of the execution of said administration task to said administration client.

According to preferred embodiments, the invention comprises one or more of the following features, which may be used separately or in partial combination with one another or in complete combination with one another:

said administration task is determined by the programming of a computer program by a user of the administration client;

said administration task is a script written in a computer language such as Python;

a process dedicated to said administration client executes the administration task in collaboration with said information;

said information is accessible in the context of the dedicated process in accordance with a copy-on-write mechanism;

said information is updated according to changes in the environment of the supercomputer;

when said information is updated, said administration task being executed is not affected by the update.

Another aspect of the present invention is a computer program comprising software means suitable for implementing the method as previously described when triggered by a platform for processing the information.

Another aspect of the present invention is an administration server of a supercomputer, suitable for:

first loading information on the environment of said supercomputer;

receiving an administration task transmitted by an administration client;

executing said administration task in collaboration with said information, previously loaded;

transmitting the results of the execution of said administration task to said administration client.

According to one embodiment, this server may comprise a main process for loading information on the environment of said supercomputer in advance and, on reception of a connection of an administration client, creating a dedicated process, said dedicated process being suitable for:

receiving an administration task transmitted by said administration client;

executing said administration task in collaboration with said information, previously loaded;

transmitting the results of the execution of said administration task to said administration client.

Another aspect of the present invention is a system comprising an administration server as previously described and at least one administration client.

Other features and advantages of the invention will emerge from a reading of the following description of a preferred embodiment of the invention, given by way of example and with reference to the accompanying drawings.

DETAILED DESCRIPTION

Figure 1:
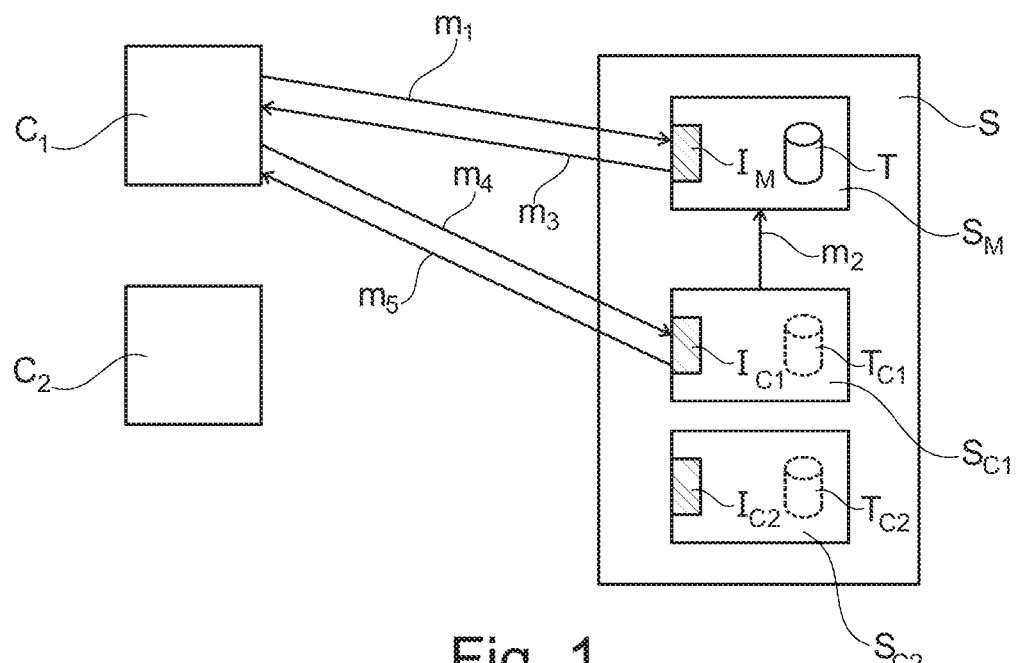
FIG. 1 depicts schematically an example of client/server architecture according to one embodiment of the invention.

As depicted in FIG. 1, the system according to the invention is composed of an administration server S and one or more administration clients C1, C2. The concepts of server and clients must here be understood in their logic or functional sense: it may for example be a case of distinct computer programs or distinct processes of the same computer program. They may in particular be implemented on distinct information processing systems and interact via a communication network connecting the various processing systems.

As is known per se, information processing systems are equipped with operating systems, and optionally various middleware layers for rendering the mechanisms of the invention independent of the underlying infrastructure and therefore independent of knowing whether the server and the client or clients are distributed or co-located and the way in which they interact physically.

Typically, the server S is a process executed on an operating system of the Unix type.

It loads in memory the information on the environment of the supercomputer. This information may be available in advance on a specific server or several specific servers, in particular stored on a hard disk. Some information may be co-located on the same information processing system as the server S, other information may be located on a remote system, but the invention can apply to these various situations.

The server S recovers the information from one or more sources and loads it therefore into a memory, typically the random access memory of an information processing system on which it is itself deployed.

This loading may last for several seconds, or even minutes, but, as will appear clearly hereinafter, this loading is carried out only once, when the server S is started up. It may in particular be done even before a first request from an administrator, so that no latency is introduced by this loading, even for a first administration task. It should also be noted that a reloading mechanism makes it possible to update the information available to the administration tasks.

The clients C1, C2 may also be processes executed on an operating system of the Unix type. They may be direct commands or have a man-machine interface allowing interaction with a human administrator.

Figure 2:
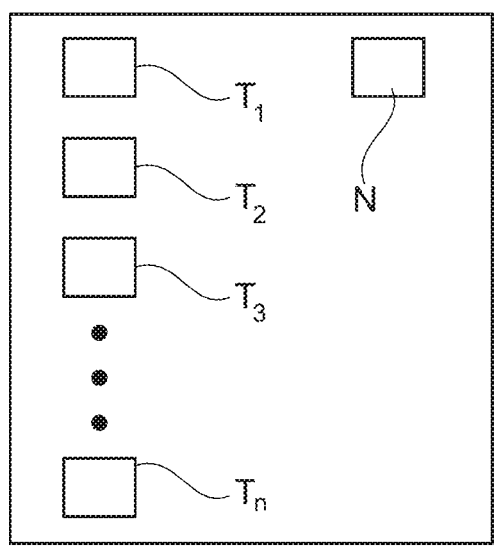
FIG. 2 depicts schematically a man-machine interface able to be deployed on an administration client according to one embodiment of the invention.

FIG. 2 shows schematically an example of a man-machine interface. On a screen V, buttons T1, T2, T3, . . . Tn are displayed, corresponding to n predefined administration tasks. These administration tasks are computer programs, that is to say lists of instructions that can be executed by an information processing system.

For example, they may be scripts, or "scriptlets", written in a computer language such as Python. A script language is a programming language that makes it possible to manipulate the functionalities of a computer system configured to supply to the interpreter of this language an environment and an interface that determine the possibilities thereof. The script language may then dispense with low-level constraints—taken over by means of the interface—and benefit from a high-level syntax. The script language is generally executed using files containing the source code of the program that will be interpreted.

A script is associated with each button T1, T2, T3, . . . Tn. Selecting a given button causes the selection of the corresponding script and transmission thereof to the server S.

A button N may be available also on the man-machine interface, making it possible, through selection thereof, to create a new script or, more generally, the computer program corresponding to the administration task. The administrator can then program the new script, for example in Python language, save it and transmit it to the server S. After saving, provision may be made for it to become accessible from the buttons T1, T2, T3, . . . Tn of the predefined tasks.

When the server S receives the administration task (in the form of an executable program, for example a scriptlet), the information on the environment of the supercomputer is already loaded in memory. It can therefore directly execute the task received, without waiting and without latency, in collaboration with this information on the environment. This execution, in itself, is in accordance with the prior art: it is a case of conventional execution of a computer program within the server S, and therefore some of the functions interact with the content of the information.

One possible implementation of the invention consists of offering to the administration tools a programming interface, or API (standing for "application programming interface") making it possible to disclose an "exec" function, which may have as its input a scriptlet and optional "args" parameters, and at the output an object containing the results of the execution of the scriptlet. For the program (the administration tool) using this function, the way in which the execution takes place is transparent.

This function can be defined thus: def exec(scriptlet, args).

This function transmits the scriptlet that has been changed to a parameter, with any other parameters, to the server S. This way of proceeding makes it possible to execute locally this scriptlet that has been changed to a parameter on the server, taking advantage of its environmental context.

The traffic involved by this way of proceeding on the communication network connecting the server S and the client or clients is thus minimal, since it is merely, in one direction, a few lines of codes, and in the other direction an object containing the results of the execution of the administration task.

In particular, therefore, the environment information remains locally on the server S and does not pass over the communication network.

This way of proceeding appeared advantageous to the inventors compared with a disclosure, in an API, of the various functions of manipulation of the environment information allowing processing thereof remotely on the server S from the clients C1, C2.

It is in particular difficult to define such an interface since this is stuck between two contradictory problems:

Firstly, it must be sufficiently rich to allow a large number of manipulations of the information in order to deal with all problems, not known in advance, of the administrator.

Secondly, since the items of environment information are often linked, the execution of a given function may result in a large portion of the information, for example on the topology. Such an interface may for example comprise functions defined as:

def get_all_switches( )
def get_all_ports( )
def get_all_links( )
def get_all_failing_switches( )
def get_all_failing_ports( )
def get_all_failing_links( )

This portion then passes over the communication network to the client C1, C2 in order to be processed, and before execution of the following function. In any event, there is no limitation to the volume of data that can be transferred by each of the available functions. As a result, such an architecture would not be possible in the context of a large environment information base.

The invention proposed therefore does indeed make it possible to limit to the minimum the volume of data passing between the server S and the clients C1, C2.

According to one embodiment of the invention, execution of the administration task on the remote server S is carried out by an RPC (remote procedure call) mechanism. It may be based on an existing infrastructure or one created specifically for implementing the invention. Such an infrastructure may be based on the ZeroMQ infrastructure. As will be seen later, one interesting functionality of the underlying infrastructure is supporting the fork( ) function.

According to one embodiment of the invention, this fork( ) function enables the server S to advantageously manage the competing accesses coming from a plurality of administration clients C1, C2.

In particular, the functioning of the server S according to one embodiment of the invention makes it possible to perform only one loading of the environment information, whatever the number of clients C1, C2 performing administration tasks at the same moment.

The server S contains, when it is started up, a single execution process $S_M$, the purpose of which is firstly to load the environment information T and to await requests m1 coming from the clients C1, C2 on an interface $I_M$.

These requests may be transmissions of administration tasks or prior messages, or the simple connection of a client. On receiving such a request, the first process $S_M$ initiates the creation of a child process for example by means of the fork( ) function.

This child process has its own addressing space and is dedicated to the management of the client C1 that sent the request.

This child process, once created, transmits (reference m2 in FIG. 1) an address of an interface IC1 associated with the parent process SM, which can then communicate it to the client C1, in response (reference m3) to its request m1.

Consequently the client C1 uses this address for all subsequent communications m4 with the server S. This interface IC1 may be a socket.

The main process SM no longer performs any processing vis-à-vis the client C1, and awaits a possible other request from the clients. When client C2 transmits such a request, it then creates another child process SC2 and, in the same way, transmits to the client C2 the address of the interface IC2 to be used by this client C2 in its communication with the server S.

The client C1 then transmits the administration task to the dedicated socket IC1 via the message m4; and the client C2 transmits its administration task to the dedicated socket IC2. Naturally, the invention is not limited to two simultaneous clients but may manage any number of clients connecting the server S: as many child processes SC1, SC2, . . . will be created as there are clients C1, C2, . . . connected at the same instant.

The child processes SC1, SC2 can execute the respective administration tasks, received on their interfaces IC1, IC2, in collaboration with the environment information.

This information T was previously loaded into the memory of the server S by the main process TM.

This information can be updated when the environment changes. A mechanism is established for monitoring the changes to the environment, for example with the use of an "inotify" function.

The updates may be transparent for the applications and for the clients C1, C2. In concrete terms no interruption of service takes place and the requests emanating from the clients continue to be processed continuously while the information is updated in parallel in order to adapt to the changes in the environment of the supercomputer SC. The administration task currently being executed is not affected by the updating of the environment information.

The environment information is accessible in the context of the child process in accordance with a copy-on-write mechanism.

For example, copies TC1, TC2, . . . of this information may be made at the time the child processes SC1, SC2 are created, for example by executing the fork( ) function. Preferentially, these are "copies-on-write", or "COWs".

It is therefore a case initially merely of a simple reference to the information T previously loaded by the main process SM. Only in the case of the modification of data within this information is a local copy of the modified data made in the context particular to the corresponding child process. This local copy is also made when the data of the process SM are updated.

Consequently, in the case where the administration task does not cause any modification to the environment information, the corresponding child process functions in collaboration directly with the information loaded by the main process SM. However, the isolation of the data between processes and the integrity of the administration information are ensured by copying the data impacted by any modification in the context of the child process, thus leaving the original version T intact.

The child processes SC1, SC2 may be designed to periodically send messages of the "heartbeats" type indicating to the respective client C1, C2 that the administration task is currently being executed. It may reply thereto, so that each party can thus monitor the state of the other, and react in the case of any problem with the other party. For example, if the client no longer receives periodic messages, it can deduce from this that the administration task is no longer being executed by the server, and can then, for example, transmit a new request to the server S. It can also transmit to the main process SM a message indicating the state of the child process, requesting it for example to interrupt this child process that is no longer functioning.

When the execution of the administration task is completed, the child process can transmit the results by a message m5 to the client C1. The child process $S_{C1}$, can then destroy itself.

Thus not only is there no loading at each new request from a client, but furthermore a single instance of the environment information is present in memory, which minimises the requirements for memory space and resources.

Furthermore, the server is immediately available for processing the requests from new clients, since the main process is dedicated to the reception of requests and to the creation of dedicated child processes: the processing of each administration task is thus offset to a child process in order to release the main process.

The information T is continuously kept loaded in memory, even if no administration task is under way, so as to be able to process any new task immediately, without loading information. When a new task is processed, as seen previously, a dedicated process will be created with access to the information via a copy-on-write mechanism.

According to one embodiment, a child process SC1 may be composed of two separate parts, which may be implemented each by a respective execution thread.

A first part may be responsible for communication both with the main process SM of the server and with the dedicated client C1, as well as with the second party.

This second party may be responsible for executing the administration task, in collaboration with the environment information T, $T_{C1}$. When the administration task has ended, the second party transmits the results to the first party, which, in its turn, transmits them to the client C1.

Naturally the present invention is not limited to the examples and to the embodiment described and depicted, but is capable of numerous variants accessible to persons skilled in the art.

The invention claimed is:

1. A method for reducing latency in performance of administration tasks for a supercomputer, the method comprising:
    transmitting, by an administration client, an initial administration task to an administration server associated with environment information of a supercomputer;
    subsequent to the transmitting the initial administration task, determining a subsequent administration task on the administration client;
    subsequent to the determining the subsequent administration task, transmitting, by the administration client, script code of the subsequent administration task to an administration server associated with the environment information of the supercomputer having attained a power that ranges from some petaFLOPS to an exaFLOP, the environment information previously being loaded into a memory of the administration server before the transmitting the initial administration task, and the environment information of the supercomputer comprises information on a topology of the supercomputer;
    directly executing the script code in collaboration with the previously loaded information on the topology of the supercomputer; and
    transmitting, by the administration server, the results of the executing the script code to the administration client.

2. The method according to claim 1, wherein the subsequent administration task is determined by programming of a computer program by a user of the administration client.

3. The method according to claim 1, wherein the script is a script written in Python computer language.

4. The method according to claim 1, wherein a process dedicated to the administration client executes the subsequent administration task in collaboration with the environment information.

5. The method according to claim 4, wherein the environment information is accessible in the context of a dedicated process in accordance with a copy-on-write mechanism.

6. The method according to claim 1, wherein the environment information is updated according to changes in an environment of the supercomputer.

7. The method according to claim 6, wherein when the environment information is updated, the subsequent administration task in the process of being executed is not affected by the update.

8. An administration server of a supercomputer for reducing latency in performance of administration tasks for the supercomputer, the administration server configured to:
    load environment information of a supercomputer having attained a power that ranges from some petaFLOPS to an exaFLOP, the environment information comprising information on a topology of the supercomputer;
    subsequent to the load environment of the supercomputer, receiving an initial administration task;
    subsequent to the receiving the initial administration task, receive script code of a subsequent administration task transmitted by an administration client;
    directly execute the subsequent administration task in collaboration with the previously loaded environment information; and
    transmit results of the execute the subsequent administration task to the administration client.

9. The administration server according to claim 8, comprising a main process for previously loading environment information of the supercomputer and, on reception of a connection of the administration client, creating a dedicated process, the dedicated process configured to:
    receive the script code of the subsequent administration task transmitted by the administration client;
    execute the script code in collaboration with the environment information, previously loaded; and
    transmit results of the executed script code to the administration client.

10. A system comprising:
    an administration server of a supercomputer for reducing latency in performance of administration tasks for the supercomputer, the administration server configured to:
        load environment information of a supercomputer having attained a power that ranges from some petaFLOPS to an exaFLOP, the environment information comprising information on a topology of the supercomputer;

subsequent to the load environment of the supercomputer, receiving an initial administration task;

subsequent to the receiving the initial administration task, receive a script code of a subsequent administration task transmitted by an administration client;

execute the script code in collaboration with the environment information of the supercomputer the environment information of the supercomputer having been previously loaded; and transmit results of the executed script code to the administration client;

the administration server comprising:
  a main process for previously loading environment information of the supercomputer and, on reception of a connection of the administration client, creating a dedicated process, the dedicated process configured to:
    receive the script code transmitted by the administration client;
    directly execute the script code in collaboration with the previously loaded environment information; and
    transmit results of the executed script code to the administration client; and
  the administration client.

* * * * *